United States Patent [19]

Yoshida

[11] 4,070,925
[45] Jan. 31, 1978

[54] POWER TRANSMISSION FOR MOTORCYCLES

[75] Inventor: Kazuyoshi Yoshida, Tokyo, Japan

[73] Assignee: Honda Giken Kogyo Kabushiki Kaisha, Tokyo, Japan

[21] Appl. No.: 748,659

[22] Filed: Dec. 8, 1976

[51] Int. Cl.² ............................................. F16H 47/00
[52] U.S. Cl. ..................................... 74/720; 192/3.27
[58] Field of Search ................. 74/331, 340, 356, 695, 74/700, 701, 730, 732, 688, 718, 720, 655; 192/3.24, 3.27

[56] References Cited

U.S. PATENT DOCUMENTS

| 2,949,047 | 8/1960 | Burckhardt | 74/720 X |
| 3,703,107 | 11/1972 | Piret | 74/695 |

Primary Examiner—Benjamin W. Wyche
Assistant Examiner—Frank H. McKenzie, Jr.
Attorney, Agent, or Firm—Lyon & Lyon

[57] ABSTRACT

A compact power transmission utilizing a torque converter and particularly adapted for motorcycles, employs an idler shaft driven by the engine crankshaft, an input shaft driven by the torque converter, and an output shaft, the torque converter overlapping the ends of the idler shaft and the output shaft, the input and output shafts each carrying a clutch, the two clutches being disposed in compact axially offset and radially overlapping relation and providing dual drive connections to the output shaft forming a low gear drive and a top gear drive.

2 Claims, 1 Drawing Figure

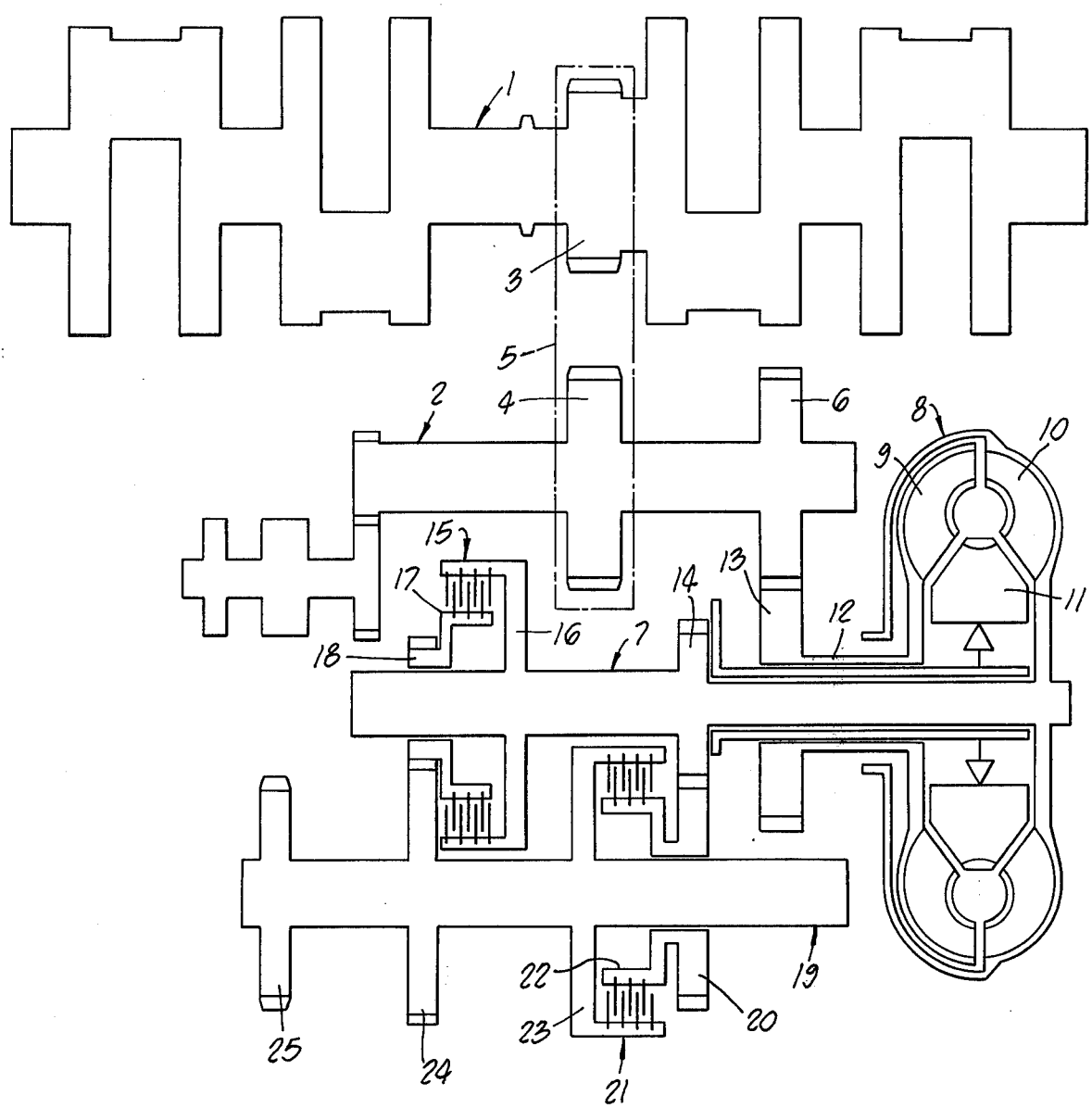

POWER TRANSMISSION FOR MOTORCYCLES

This invention relates to a power transmission assembly particularly adapted for motorcycle engines or the like and includes a novelly arranged compact drive means utilizing a torque converter. The torque converter is mounted upon one of a pair of parallel shafts having selectively operable drive means for connecting them in driving relationship. One clutch is provided on each shaft and the two clutches are disposed in axially offset and radially overlapping relation, to minimize the size of the transmission assembly.

The FIGURE is a fragmentary essentially diagrammatical sectional view of a motorcycle engine showing the power transmission assembly.

The power transmission assembly is particularly adapted for motorcycles, or the like. Disposed parallel to the crank shaft 1 is an idler shaft 2. The two shafts are connected by drive elements 3 and 4 and a drive connection 5 indicated by broken lines. The idler shaft 2 is provided with a secong gear 6.

Disposed parallel to the idler shaft 2 is an input shaft 7 at one end of which is mounted a conventional torque converter 8 comprising a pump 9, turbine 10 and stator 11. The pump 9 is connected by a sleeve 12 surrounding the input shaft 7 to a gear 13 which is engaged by the gear 6.

The input shaft 7 is provided with an input gear 14 fixed thereto in a location between the positions of the parts 4 and 6. Disposed in a region on the other side of the drive element 4 is a clutch 15. The clutch includes a driving assembly 16 secured to the shaft 7 and a driven assembly 17 carrying an input gear 18 journalled on the input shaft 7.

An output shaft 19 is disposed parallel to the input shaft 7 and on which is journalled an output top gear 20 which engages the input gear 14 and is connected to the output shaft 19 by a clutch 21 which includes a driving assembly 22 and a driven assembly 23, the driven assembly 23 being secured to the driving shaft 19. Fixed to the output shaft 19 is an output low gear 24 which is engaged by the input gear 18.

The output shaft 19 extends beyond the output low gear 24 and is provided with a final drive sprocket 25, for driving the rear wheel of the motorcycle.

The low gear clutch 15 and the top gear clutch 21, which are conventional friction clutches, are operated in a conventional manner to drive either the output low gear 24 or the output top gear 20.

It will be noted that a particularly compact assembly is achieved by mounting the two clutches 15 and 21 on separate parallel shafts 7 and 19, the shaft 7 carrying the torque converter 8 which overlaps the ends of the two shafts 2 and 19. This compactness is of primary importance in regard to motorcycle drive assemblies.

Having fully described my invention it is to be understood that I am not to be limited to the details herein set forth, but that my invention is of the full scope of the appended claims.

I claim:

1. A power transmission assembly for a motorcycle engine having a crank shaft, the power transmission assembly including an idler shaft driven from the crank shaft, an input shaft, and an output shaft, the shafts all being parallel, a torque converter mounted on the input shaft, means for driving the torque converter from the idler shaft, first means for driving the output shaft from the input shaft including a clutch mounted on the output shaft, second means for driving the output shaft from the input shaft including a clutch mounted on the input shaft, the torque converter overlapping the ends of the idler shaft and output shaft to form a compact assembly, and a final drive element on the output shaft.

2. A power transmission assembly for a motorcycle engine having a crank shaft, the power transmission assembly including an idler shaft driven from the crank shaft, an input shaft, and an output shaft, the shafts all being parallel, a torque converter mounted on the input shaft, gear means for driving the torque converter from the idler shaft, gear means for driving the output shaft from the input shaft including a friction clutch mounted on the output shaft, additional gear means for driving the output shaft from the input shaft including a friction clutch mounted on the input shaft, said torque converter overlappng the ends of the idler shaft and output shaft to form a compact assembly, and a final drive element on the output shaft.

* * * * *